(12) United States Patent
Wolper et al.

(10) Patent No.: US 8,700,477 B2
(45) Date of Patent: Apr. 15, 2014

(54) GARMENT FIT PORTRAYAL SYSTEM AND METHOD

(75) Inventors: Andre E. Wolper, Portland, OR (US); Isabelle Haulin, Portland, OR (US); Andrew S. Idsinga, Portland, OR (US); George D. Borshukov, Portland, OR (US)

(73) Assignee: Embodee Corp., Portland, OR (US)

( * ) Notice: Subject to any disclaimer, the term of this patent is extended or adjusted under 35 U.S.C. 154(b) by 646 days.

(21) Appl. No.: 12/454,947

(22) Filed: May 26, 2009

(65) Prior Publication Data

US 2010/0306082 A1 Dec. 2, 2010

(51) Int. Cl.
*G06Q 30/00* (2012.01)

(52) U.S. Cl.
USPC .......................................... 705/26.1; 705/27.1

(58) Field of Classification Search
USPC ................................................. 703/2; 705/26
See application file for complete search history.

(56) References Cited

U.S. PATENT DOCUMENTS

| | | | | |
|---|---|---|---|---|
| 5,850,222 | A * | 12/1998 | Cone | 345/418 |
| 6,404,426 | B1 * | 6/2002 | Weaver | 345/419 |
| 6,665,577 | B2 * | 12/2003 | Onyshkevych et al. | 700/130 |
| 6,882,897 | B1 * | 4/2005 | Fernandez | 700/132 |
| 6,888,640 | B2 * | 5/2005 | Spina et al. | 356/601 |
| 7,120,289 | B2 * | 10/2006 | Baumberg | 382/154 |
| 7,149,665 | B2 * | 12/2006 | Feld et al. | 703/2 |
| 2001/0026272 | A1 * | 10/2001 | Feld et al. | 345/419 |
| 2001/0030754 | A1 * | 10/2001 | Spina et al. | 356/601 |
| 2003/0076318 | A1 * | 4/2003 | Shaw-Weeks | 345/419 |
| 2004/0049309 | A1 * | 3/2004 | Gardner et al. | 700/132 |
| 2004/0239670 | A1 * | 12/2004 | Marks | 345/419 |
| 2005/0102638 | A1 * | 5/2005 | Jiang et al. | 715/855 |
| 2005/0234782 | A1 * | 10/2005 | Schackne et al. | 705/27 |
| 2006/0161572 | A1 * | 7/2006 | Vogt et al. | 707/101 |
| 2008/0071559 | A1 * | 3/2008 | Arrasvuori | 705/1 |
| 2008/0235582 | A1 | 9/2008 | Zalewski et al. | |
| 2009/0222127 | A1 * | 9/2009 | Lind | 700/132 |
| 2010/0036211 | A1 | 2/2010 | La Rue et al. | |

OTHER PUBLICATIONS

International Search Report and Written Opinion for Int'l Patent App. No. PCT/US11/22367; Mar. 28, 2011 (8 pgs).

(Continued)

*Primary Examiner* — Talia Crawley
(74) *Attorney, Agent, or Firm* — Ater Wynne LLP (57) ABSTRACT

An on-line garment fit portrayal system configured to operate on a specialized server linked over the internet or any network using standard web services to at least one web-enabled player device capable of common image format display is described. The system comprises a server-side garment model storage capability containing one or more garments, with parameters for each garment chosen from the groupings that include a garment piece parts list, piece spatial properties, piece mechanical parameters, piece optical parameters, and assembly information; a server-side modeler mechanism configured for generating a three-dimensional model of a subject's body from individual body data, the model being represented by body data stored in a body model storage capability; a server-side simulator mechanism operatively coupled with the garment model storage capability and the body model storage capability for simulating a three-dimensional form fit of a garment represented in the garment model storage capability onto a body represented in the body model storage capability, the simulator mechanism producing a portrayal subject model; and a server-side rendering mechanism operatively coupled with the simulator mechanism for portraying a perspective view on any web-enabled device's display screen of the portrayal subject model representing a three-dimensional form fit of the garment on the subject's body.

37 Claims, 4 Drawing Sheets

(56) References Cited

OTHER PUBLICATIONS

Turk. "Texture Synthesis on Surfaces." In Proceedings of the 28th annual conference on Computer graphics and interactive techniques (SIGGRAPH '01) [online], pp. 347-354. Published Aug. 12, 2001. Found at: http://www.csee.umbc.edu/~alark1/papers/texturing/texsynth_turk.pdf > entire document. especially Abstract; p. 347, col. 1, para 2 and col. 2, para 4; p. 349, col. 1, para 2; p. 352, col. 2, para 2 (8 pgs).

Crawley, Talia; Final Office Action dated Oct. 17, 2013 from U.S. Appl. No. 12/454,947 (19 pgs).

Ade, Roger; Office Action dated Oct. 7, 2013 from U.S. Appl. No. 13/733,093 (11 pgs).

\* cited by examiner

GARMENT FIT PORTRAYAL SYSTEM AND METHOD

FIELD OF THE INVENTION

The invention relates generally to the field of garment fit, and the portrayal of garment fit. More particularly, the invention relates to the on-line provision to any web-enabled device of the ability to digitally try on a garment before its purchase to ensure that personal user preferences such as fit and look will be fulfilled.

BACKGROUND OF THE INVENTION

The human need for apparel is universal, and drives one of the largest global industries and associated supply chains. Efficiently matching apparel supply with consumer needs and preferences as they relate to function, fit, and style is one of the big challenges of the industry. Typically, consumer transactions for apparel articles or garments are fraught with risk and frequent dissatisfaction due to poor fit. The retail industry aims to serve consumers via physical store-front locations providing opportunity for display, perusal and try-on; however the service offered by such locations is necessarily limited as they consume considerable resources, are expensive to maintain, and are thus limited in number and size, especially outside of urban areas. While the apparel industry produces a huge supply of articles in nearly limitless styles and sizes, in-store inventory is constrained by the limited space available, resulting in less availability of styles and sizes than what is or could be manufactured to supply the broad range of needs. Also, consumers often find store-front locations difficult to get to on their schedule, or inconvenient due to the large amount of time that is required by physical store visits and associated in-store garment try-on.

During the last decade many merchants have begun to offer ever more apparel via the internet; consumers find that online stores typically provide greater range of product and convenience than traditional storefronts. Many online stores gather data about the online consumer and are experimenting with various methods to use table-driven sizing charts or other relatively simplistic methods to recommend sizes or styles, or perhaps to filter the available offerings in the hope that the consumer may more easily find something for their need. However, as of today, all online stores lack an effective method to facilitate actual try-on, thus greatly increasing the transactional risk to both buyer and seller. This in turn has retarded the adoption of the internet for apparel transactions relative to that of other categories such as consumer electronics or other product categories that have easily understood dimensions and do not require an assessment of fit against one's own unique requirements.

Imagine how difficult it would be for a consumer if all clothing stores lacked an actual fitting room. Yet this is the situation a consumer faces when attempting to purchase apparel on-line. What is needed is a way of enabling a consumer to conveniently consider and try-on garments of interest from any location.

The enablement of heretofore-unavailable digital online try-on reduces a consumer's fit uncertainty, and associated transaction risk—because the limitations of physical store access and try-on are removed. Transactions facilitated in this way benefit consumers as well as merchants—through a more effective utilization of the already greater internet product assortment, increased consumer satisfaction with their purchases, greater satisfaction of consumer need leading to greater sales, reduced returns, and ultimately greater loyalty by a consumer to the product brand. Such on-line services will be referred to herein as ONLINE TRY-ON$^{SM}$ services offered by EMBODEE™. ONLINE TRY-ON$^{SM}$ and EMBODEE™ are trademarks owned by MettleWorks, Inc., world-wide rights reserved.

Improved matching between the industry's supply and the consumer's need additionally leads to further subsequent efficiencies, and ultimately accrues to benefit both consumers and merchants, for the following reasons.

As ONLINE TRY-ON$^{SM}$ services would enable a greater percentage of need supplied through internet fulfillment, they in turn would reduce the retail industry's cost of garment inventory and fulfillment through more centralized warehouse operations. This is because physical store-fronts are burdened with greater costs due to retail square footage costs being much greater than warehouse square footage, retail square footage accommodating less inventory than warehouse square footage, and retail labor costs being much greater than warehouse-based fulfillment costs. Articles sold through internet fulfillment also require much less handling than physical storefront locations, thus further reducing costs.

In addition, ONLINE TRY-ON$^{SM}$ services enable reduced consumption of production resources and energy because internet-based fulfillment enables reduced waste because centralized inventory can be more tightly controlled than distributed (in-store) inventory, and because transport to intermediate delivery facilities such as store fronts can be reduced. Thus, industry practices become more sustainable, and fulfillment of consumer's needs becomes more ecologically sound.

Recent innovations in simulating virtual wear articles are summarized in U.S. Pat. No. 7,149,665 B2 entitled SYSTEM AND METHOD FOR SIMULATION OF VIRTUAL WEAR ARTICLES ON VIRTUAL MODELS to Feld, et al. This patent describes conforming a virtual 3D wear article on a virtual 3D model within constraints imposed on the article by a data set representing at least one physical property of the material including material type, texture, weave, threads per unit measure, shear strength, stress, strain, elasticity, yield strength, etc. System architecture includes a vendor station, a user station, and a designer station including a personal computer (PC) that is connected to the vendor stations via the internet. The software—including a 3D real-time rendering engine capable of taking the data associated with the virtual model and wear articles, calculating the fit of the virtual wear model on the virtual model, and displaying the data in a real-time simulated three-dimensional format on a computer screen—is downloaded to the user station from an internet site, and is executed at the user station. Thus, the system described in this patent requires a high-compute power user station for the numerous, arithmetically complex calculations required of real-time fit simulation and subsequent rendering. The patented system requires its software to be developed for every client device that it seeks to support, thus limiting its reach to only directly supported client devices. In addition, it is incompatible with ubiquitous, portable, internet-capable devices such as smart phones, PDAs, mobile handsets, or other any other such device lacking sufficient computational capability to run it, or the availability of this software for it. Finally, it is generally well accepted that a majority of online consumers are reticent or unwilling to download custom software to their client devices because most find it inconvenient, or are fearful of the security risks that software downloaded from the internet can pose. The consequence of this reticence is a sharply reduced reach by any website requiring custom software downloads, and results in online merchants avoiding the use of such technology.

Physically based simulation of cloth is notoriously slow because all methods employ computationally expensive numerical methods. This is an area of research, with speed-ups being pursued by the academic community through the use of parallelization via either central processors or graphics processors. One such example is the paper "Parallel Techniques for Physically-Based Simulation on Multi-Core Processor Architectures", by Thomaszewski, Pabst, & Blochinger (2008, Computer & Graphics, International Journal of Systems & Applications in Computer Graphics). As papers in the field show, the computational cost for the draping process of a garment correlates directly with the distance that must be travelled between points on the garment and a given body form on to which it is draped, and the time required to allow the garment to achieve a rest state. In their paper the authors report significant speed-ups, however, they still cannot achieve the speeds require for interactive applications such as the one contemplated here. On current generation high-end microprocessors, such as for example an INTEL CORE™ i7, the simulation of cloth and the fit of a dress or shirt on a human body form can take on the order of 30-60 seconds from a flat starting state in order to attain (simulate) the correct shape of the dress or shirt once "worn", and another 30-60 seconds in order to achieve a highly realistic visualization of the result using advanced visualization techniques such as ray-tracing.

In order for the EMBODEE™ service to achieve the performance required to service, for example, an internet shopper seeking to do an ONLINE TRY-ON$^{SM}$ of a garment, a 1-2 minute wait time would be a hindrance to its use in a shopping context, where speed and convenience are of great importance. Further, if the shopper needs a realistic portrayal via additional perspective views (images), an additional 1-2 minute wait time for each additional image further depicting fit also would clearly not be acceptable. Such unreasonable delay also would make it impossible to offer the shopper a video "vignette" of the garment via a set of streaming images (which would require 10's or 100's of images (frames) for even a short vignette).

Traditional approaches such as those described above have so far involved methods that rely on the computational power available to a given user, such as a PC or other workstation. However, the problem is not only that the best personal computers lack the power needed for an on-demand, real-time ONLINE TRY-ON$^{SM}$ service for the foreseeable future, but also that consumers increasingly desire to access their network based services from not only their personal computers, but also from other devices, including browser enabled phones, for instance. Such devices have 1-2 orders of magnitude less capability than contemporary computers, thus putting universal availability of on-demand try-on further out of reach. Further, an ONLINE TRY-ON$^{SM}$ service as enabled by this invention needs to be made available to not just tens or hundreds of consumers, but to thousands or even hundreds of thousands of potential consumers that are resident on global networks such as the internet today. Such a service needs to operate not on individual or enterprise level scale, but on an internet- or web-scale.

Thus, what is needed is a method to deliver at least two orders of magnitude of speedup, or more, and to make this speedup available to any user, and on any device, regardless of the computational or software resources of their web-enabled device. Getting to greater speedup also facilitates the economic feasibility of delivering an on-demand ONLINE TRY-ON$^{SM}$ service, because less compute time per try-on also means more users can be serviced with a given amount of server resource, and thus with a lower per try-on cost.

SUMMARY OF THE INVENTION

A method for the ONLINE TRY-ON$^{SM}$ of a specific textile article on any unique body form is disclosed. Provided via any web-enabled device, this method provides individual users a highly realistic fit portrayal that helps them see and judge how a prospective textile article will fit. A system built using the disclosed method delivers fit portrayals as images to any web-enabled device without being limited by the constraints of a given device's location, or its storage, compute, or bandwidth limitations. Further, the article being fitted does not need to be downloaded or otherwise transferred to the client's device, nor is there any system, article, or client-specific viewing software required, thereby enabling immediate access by any web-enabled device to a potentially infinite catalog of textile articles—without the need to install software or article data on the web-enabled device, and without any dependency on the degree of compute resource available on the web-enabled device—as long as the web-enabled device can at least render a common image format. Thus, this method gives garment purveyors the ability to provision standard or personalized fit portrayals of their garments to anyone with network access, and gives individual users of the system convenient to use, on-demand, personalized fit portrayals for a principally unlimited number of garment articles—at any time, and via any web-enabled device. Individuals can utilize it to judge articles using their own fit, drape, and style preferences—and can choose the best one, according to their own personal tastes, and with confidence that what they see online during their digital try-on or 'fitting' session is what they get when their clothing purchase is fulfilled.

DETAILED DESCRIPTION OF THE PREFERRED EMBODIMENTS

Figure 1:
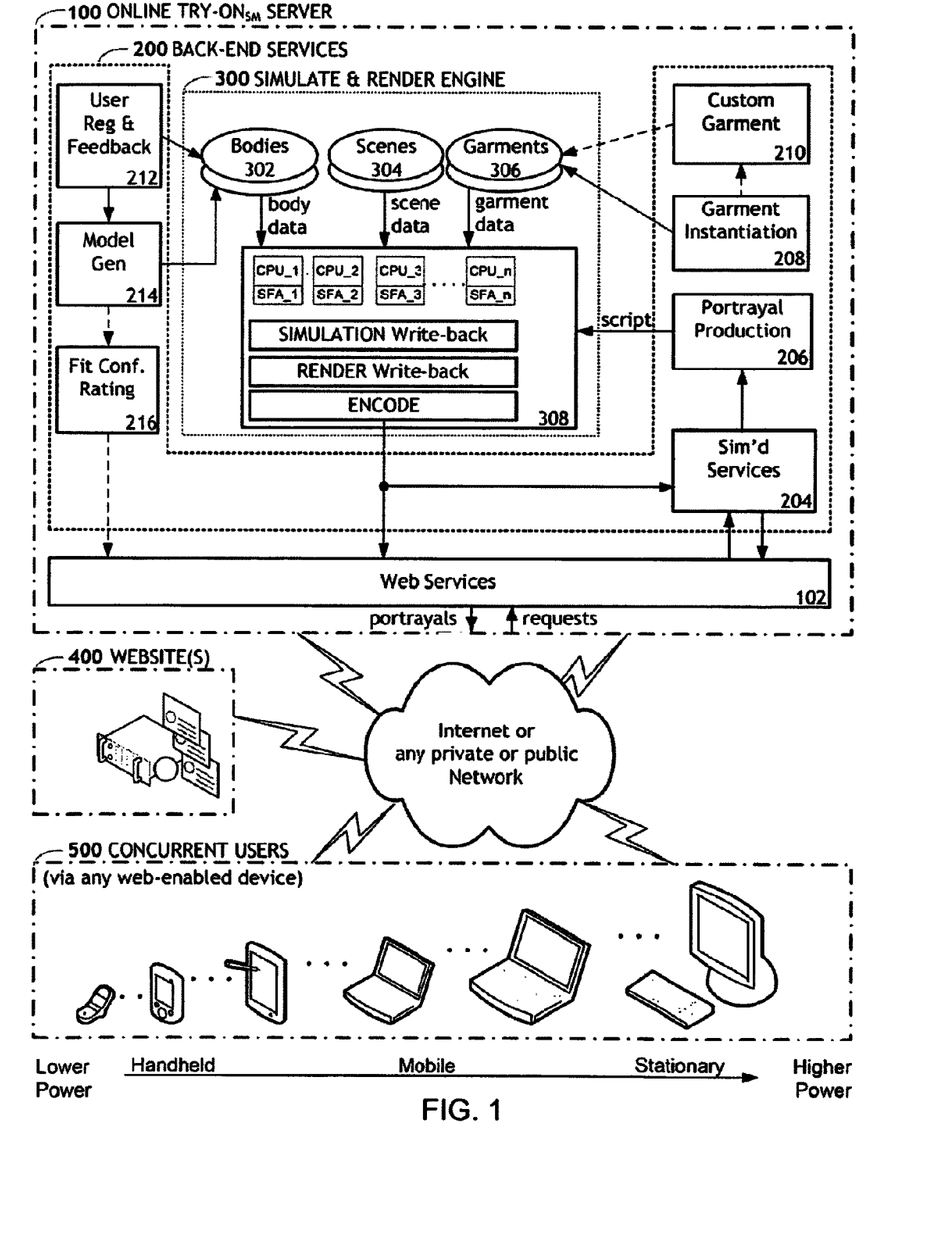
FIG. 1 is a high-level system block diagram showing a network-connected proprietary server for receiving a plurality of digital three-dimensional (3D) user specific fit portrayal requests in real-time and a plurality of possibly portable web-enabled devices for displaying corresponding portrayals to concurrent users in real time, in accordance with one embodiment of the invented system. This proprietary server is specifically architected to enable service to a large number of concurrent users, and thus is well suited for use on any network, including the internet.

FIG. 1 is a high-level system block diagram showing a network-connected proprietary server for receiving a plurality of digital three-dimensional (3D) user specific fit portrayal requests in real-time and a plurality of possibly portable web-enabled devices for displaying corresponding portrayals to concurrent users in real time, in accordance with one embodiment of the invented system. This proprietary server is capable of generating customized, user-specific portrayals to a large number of concurrent users, for use on any network, including the internet. Web Services 102 can be built using standard web services protocols and technologies, and provision the system's ONLINE TRY-ON$^{SM}$ service via any website that embeds a link to the system's services and thus provides the client-side code to a web-enabled client. In one embodiment this is accomplished with a few lines of HTML code that can run on any web browser, including those on mobile phones. If a user requests a portrayal by activating a link initiating the service, Web Services 102 assigns a Job ID to the request and determines whether a Standard Fit Portrayal (SFP) or a Personal Fit Portrayal (PFP) is to be delivered.

If a SFP is requested then it is routed along with the Job ID to Simulated ("Sim'd") Table Server 204, which performs a lookup of the request in the system's data store and returns the resultant image(s) to the appropriate requestor via Web Services 102, and retires the Job ID.

If a PFP is requested then Web Services 102 does a user look up with the User Registration & Feedback Mechanism 212 to determine if the requestor is someone whose body model has been established via a previous registration. If the requesting user is not yet registered, User Registration & Feedback mechanism 212 will proceed to query the requestor for registration. If—or once—the user is registered the PFP request is routed to Sim'd Services 204 to determine if a previous simulation for this user's body model and garment combination exists. If it does, Web Services 102 returns the resultant image(s) to the requestor, and the Job ID is retired.

PFP requests that have not been previously produced will result in a "missed" lookup in Sim'd Services 204 and cause the "on-demand" production of a new portrayal via a request to Portrayal Production 206, passing along the Garment's nearest match, if any, via a Garment Nearest Match ID. The purpose of the Garment Nearest Match ID is to overcome the simulation time challenges described in the background of the invention, and to enable system scalability, and will be described shortly.

Portrayal Production 206 commences with at least the following parameters: Job ID, Body ID, Garment ID(s), Garment Nearest Match ID, Layering Sequence, Transparency Level, Tension Display on/off, Scene ID, and Animation ID. These parameters drive the setup and cause the computation of the fit of the specified garments on the specified body model, together with the animation and rendering thereof, all of this occurring in a parallelized manner as subsequently described within Simulation ("Simulate") & Render Engine 300. The specified garment(s) are retrieved from storage repository Garments 306 (also referred to herein as a garment model storage or store); and paired with the specified body model as retrieved from storage repository Bodies 302. A given portrayal can optionally be rendered in the context of any scene which would have previously been modeled in 3D and stored within storage repository 304 as shown on FIG. 1. Such scenes are provisioned to the system through Web Services 102. It is understood that both a SFP or PFP may use the information contained within an Animation ID to subject the camera or body model in the portrayal to an animated sequence, such as a catwalk, for example. (Such may be referred to herein as "scene", "cinematography" or "grip" features for placing and modifying objects including the portrayal subject model, lighting, camera view, and real-time camera view movement. All may be implemented straightforwardly as software instructions executed by a processor.)

As the perspective view image or a stream of successive such images portraying the fit of the garment(s) on said body model is computed, the results are encoded in an image format suitable for transmission and passed back to Web Services 102 along with the Job ID, from where the results are immediately streamed back to the requesting user via the ENCODE stage within block 306. The Job ID is subsequently retired, once the Simulation and Render Write-back functions within block 306 have stored the results from the simulation output (3D file) as well as the rendered output (images) in the system's data store via Sim'd Services 204, for future re-use. The purpose of the Write-back functions is to temporarily hold the simulation and render results until they have been successfully written to Sim'd Services 204 (which may take longer than the completion of streaming), and to not hold up streaming until writing to Sim'd Services 204 is completed.

Portrayal Production 206 also has a software algorithm or mechanism running as a background task that builds and maintains a hypothetical try-on table of body and garment combinations that are likely to be requested in the future, based on a profiling of user data, garment data, and other factors. In addition, Portrayal Production 206 has a request generator running in the background, and whenever the utilization of the system's Simulate & Render Engine 200 (also referred to herein as a simulator and modeler mechanism) falls below a programmable threshold the request generator removes an entry from the hypothetical try-on table and injects it into the Simulation & Render Engine 300 as a new, and speculative, portrayal job, which causes the Web Services 102 to store the results in a data store within Sim'd Services 106, for future use. This enables the system to use computational resources that would otherwise be idle toward the production and storage of additional portrayals, and makes them available for a future use.

Both simulation output (pre-render stage) and render output (post-render stage) are kept in the Sim'd Services 204 data store so that a given garment's simulation results can be re-used, but possibly in a different scene, or at a higher (or lower) quality of rendering, for example.

An important element of the system's design is to achieve the scalability of ordinary web services such as for example a photo-sharing or video streaming site, and to approach a similar operational cost, but for a personal try-on service that potentially entails 1-3 orders of magnitude more computation than a more ordinary web service would require for the delivery of a given image or image set that is only stored—but not generated—by the more ordinary web service. This is accomplished by a novel combination of several key technologies, built on the principles of parallelism and re-use. (Ordinary web services such as a photo-sharing or video streaming site—unlike a personal try-on service—do not require computationally intensive computation on a per-use basis, because the images of a photo-sharing or video streaming site are only delivered, and not actually computed, by said ordinary web service.)

In order to achieve a high degree of portrayal realism, and to enable the heretofore unavailable ONLINE TRY-ON$^{SM}$, the system has to deal with two large computational tasks: the simulation of cloth using the principles of physics, and the subsequent rendering of realistic depiction images to render the portrayal visible. The magnitude of these tasks is in part what has prevented the availability of a real ONLINE TRY-ON$^{SM}$ capability on any web-enabled device.

To complete simulation in the shortest possible time, the core of Simulate and Render Engine 300 supports parallelism on multiple levels: job-level parallelism, simulation-level parallelism, and render-level parallelism. This is done to attain greater throughput and to enable 'request to response' job times falling within the limit for an interactive experience for an on-demand try-on that is not already existent in the data store of Sim'd Services 204. In order to support these levels of parallelism, the Simulate and Render Engine 300 utilizes an array of n Central Processing Unit nodes CPU_0 through CPU_n within 308 which are coupled through a network or other suitable parallel computer architecture arrangement. Each CPU can optionally contain multiple CPU cores, and in addition each CPU can be optionally coupled with one or more Special Function Accelerators SFA_0 through SFA_n. A given SFA features floating point math acceleration support for the types of mathematical calculations required by simulation and highest quality rendering. Suitable SFAs can be either custom-built using a plurality of floating point math units or the system can be constructed using industry standard GPUs (Graphic Processing Units) as they typically feature a plurality of floating point math units. Any other suitable firmware or hardware accelerator mechanisms can be used to speed processing, within the spirit and scope of the invention.

Job-Level Parallelism:

In order to service many simultaneous users, and the jobs their requests can spawn, the system employs a job scheduler that dispatches simultaneous simulation and render job requests on to one or more available CPU and SFA nodes. In its simplest level, the system can increase the number of such nodes at the scale needed to meet anticipated throughput demands. Such may be referred to herein as a combination of front-end and back-end parallel and/or caching servers, as are known in high-speed parallel and/or pipelined (e.g. data and/or instruction-caching) computer processor architectures.

Simulation-Level Parallelism:

The simulation of cloth on a body depends upon the use of the mechanical parameters that have been stored as part of a garment in Garments 306. These mechanical parameters govern the behavior of the cloth in the simulation as forces such as gravity and friction act on the cloth, and ultimately determine the resultant drape of a garment on a given body. As described by Thomaszewski et al, at least two computational components of simulation represent opportunity for parallelization: time integration and collision handling. Time integration's linear system can be solved using a data-parallel preconditioned conjugate gradient algorithm. Collision handling's dynamic structure can be handled using multi-threaded programming with fully dynamic task decomposition. Together, the combination of such parallelization techniques leads to speedups scaling with the number of available CPUs or SFAs and thus to faster and more time efficient simulation.

Render-Level Parallelism:

The rendering of the simulation results depends on the piece mechanical and optical parameters that have been stored as part of a garment in Garments 306. The depiction generated by the rendering is derived from the interaction between the light present in a scene, which is loaded at render time from Scenes 304, and the mechanical and optical behavior of the cloth, which is specified in the piece mechanical and piece optical parameters. It is understood that mechanical and optical parameters for other scene elements such as for example the body model must be present as well if the rendering is to represent them at the highest possible levels of realism. For example, so-called shaders or similar specialized programs can be used to handle the angle of the light source as it strikes, reflects from, and shades the garment and body models, how the garment model drapes on the body model relative thereto, and the resultant garment and body model shading produces a high level of realism in the scene's light/shade portrayal. What is at issue for an ONLINE TRY-ON[SM] web service such as the one described here is that common servers powering typical web applications usually do not have hardware accelerators, e.g. GPUs or other suitable SFA components, capable of real-time, highly realistic renderings such as the ones discussed here (which consider the optical properties of the objects being portrayed). Thus, to generate highly realistic renderings of the simulation results, the ONLINE TRY-ON SERVER 100 additionally uses the plurality of CPU and SFA nodes to support render techniques such as advanced raster graphics (also referred to herein as rasterization) or ray-tracing which do consider the optical properties of the objects being rendered, and thus require the presence of a multitude of computational units, yet provide their results in real-time.

In addition to this use of parallelization, and in order to get even faster response time, and lower per job cost, the system's design is also built on the novel principle of simulation cycle re-use in order to dramatically reduce per job compute resources over time, enabling the system to become increasingly faster and cost effective the more it is used!

Re-Use:

The unique problem solved by the following approach is to leverage the re-use of a large percentage of previous simulations when each PFP can produce a potentially unique result, and thus cannot be used "as-is" unless there happens to be an exact match between two distinct user's body forms, which would ordinarily be of low likelihood unless other steps are taken. What is new in this re-use regard is that the system is able to use a significant fraction of a previous nearest match simulation result, using a nearest-match simulation result from a prior simulation as the starting point for a new simulation. This favorably impacts (i.e. reduces) the computational resource requirement of the new simulation. In addition, the system has the ability to do anticipatory simulations using the nearest-match results from a previous simulation before they are actually requested, further reducing the wait time for a new simulation. These methods are now described in further detail.

Nearest-Match Simulation:

consider that the cloth of a tried-on garment reaches a rest state subsequent to the body's cessation of motion, and only once the forces involved have reached equilibrium. One can then recognize that the amount of compute resource consumed in a simulation of the behavior of cloth on a body form correlates with the energy that must be dissipated in the simulation. In turn, the energy to be dissipated correlates to the distance that the points on the garment have to travel before the drape of the garment reaches a rest state for a particular body-garment combination. Because there is a nearly infinite variation in body forms, and therefore body models, and therefore garment-on-body fit portrayals, the system devises a method to reduce the amount of energy that must be dissipated by any one try-on simulation once one or more simulations have been run for a given garment size. In the limit this method enables the compute cost of a given simulation to asymptotically approach zero, and thus enables the system to approach the computational cost of more conventional web services, such as for example photo-sharing or video-streaming.

Figure 4:
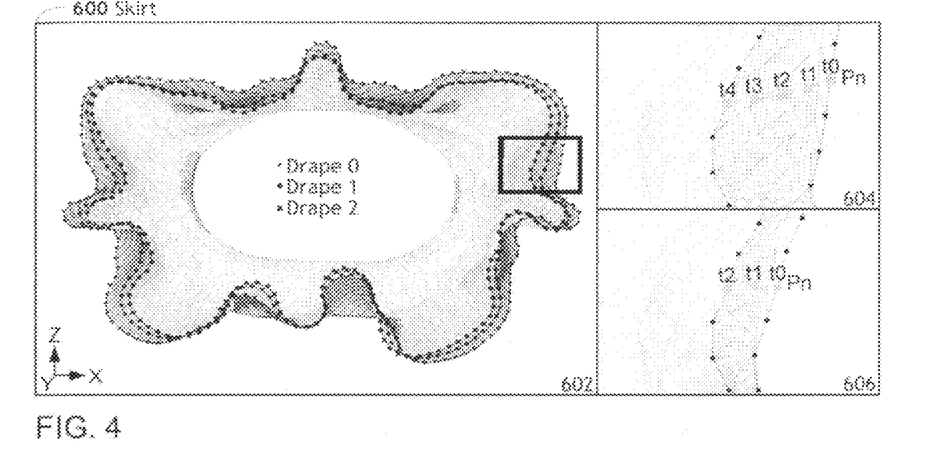
FIG. 4 is an illustration of the cloth simulation process and how it can be leveraged to enable interactive response such that the system can operate at a scale sufficient to service the worldwide web.

Further, consider that each garment model is stored in 3D form within the system's Garment Model 306 storage repository. FIG. 4 shows a perspective view along the Y axis of a sample Skirt 600, which shall serve as an example for the purposes of the following illustration. The body model that would typically reside within this skirt is not shown for purposes of legibility. The semi-oval shape within Skirt 600 represents the contact area where the wearer's hips would ordinarily be in contact with the skirt. The initial default 3D form of a garment is created by Garment Instantiation 208, one for each garment size, and each is typically generated by simulating the garment's drape on a reference body form that is suitable for an attractive portrayal of the garment as it was intended to be worn by its designer or manufacturer. The resultant default shape of this example garment is shown via a polygonal representation as "Drape 0", which corresponds to the outermost shape shown in Skirt 600.

Next, consider that each PFP will take a garment in a given size, retrieve it, place it on the requestor's unique body form, and generate a PFP that is unique to this requester. Drape 1 and Drape 2 are representative of 2 specific PFPs of the same skirt. Skirt 600 shows all 3 drapes superimposed upon each other, and shows how Drape 0 (outermost) causes the skirt to hang differently from either Drape 1 (middle) or Drape 2 (innermost). This is due to Drape 1 being a PFP from a model with smaller hips than the default model; and Drape 2 being a PFP with yet smaller hips. Recall that any given PFP result is not only sent to the requestor via Web Services 102, but also stored in Sim'd Services 204.

Further recall that the system as designed also generates and stores speculative portrayals when idle. Now recognize that the system will accumulate an increasing number of draped 3D versions for each garment size, generated from the simulation of that garment against many varied body forms over time. Next recall that the computational cost for any given simulation correlates directly with the distance that must be travelled between points on the garment and a given body form. Each new simulation can then successively use less compute resource (and time) by carefully selecting the 'nearest match' of a garment in 3D form as the starting point for the garment when a new PFP is initiated. Starting each new simulation using the Garment Nearest Match ID as the starting point—rather than the default Garment ID—enables this. The following two scenario descriptions illuminate this further with the aid of illustrations 604 and 606 (which represent enlarged fragmentary portions of illustration 602 within a bold rectangle therein).

Try-on Scenario 1: assume a hypothetical "User 2" logs into the system for the first time and tries on the skirt; no other user has tried on this particular skirt before User 2. The skirt's drape on User 2 will result in the garment falling longer on her legs because she has smaller hips than the default model associated with this example garment (represented by default Drape 0). The simulation time required to get User 2's try-on to complete is shown within illustration 604 by way of sample particle Pn, which must travel from the default position (outermost) to the rest state (innermost) before the simulation is complete. In this example the simulation begins at time t0 and completes at time t4. Recognize that the ONLINE TRY-ON$^{SM}$ of a skirt such as this will typically involve thousands of such particles moving from a starting point to their rest state during a given simulation. Once the try-on is complete the system proceeds to visualize and save the result as previously described. Because the skirt had not been tried on before the computational resource to service User 2 equaled four units of time in this scenario.

Try-on Scenario 2: now assume hypothetical "User 2" logs into the system for the first time and tries on the example skirt, except this time another user of the system ("User 1") was previously serviced. User 1's hips were such that her try-on resulted in a drape somewhere between Drape 0 and Drape 2, and caused the storage of Drape 1 in Sim'd Services 204. As a result of the Garment Nearest Match ID process described earlier the simulation for User 2 commences not with the default drape (Drape 0), but instead with User 1's version of the garment's drape (Drape 1) as the starting point. The impact of this is shown in illustration 606, using the same particle: Unlike before, particle Pn now has a shorter distance to travel to reach the rest state of Drape 2. As can be seen, User 2's simulation benefited from the prior simulation of the same garment on User 1. As a result, the computation resource consumed by User 2 in Scenario 2 equaled only 2 units of time, cutting the time and cost to simulate User 2 in half.

As the system services more and more users with a given garment, it will be appreciated that the aforementioned method creates an increasing likelihood of starting new simulations with closer matches. This in turn successively optimizes simulation run time per job, which enables the system to serve a growing percentage of PFP requests in decreasing amounts of time per job, and also increases the capacity of the system to serve an increasing number of concurrent request than would otherwise be possible with a given amount of compute resource.

Under re-use, then, simulation with a user's body model begins with the garment's reference ("standard fit portrayal") body model, and proceeds by morphing the reference body model to that of the user's body model, while subjecting the cloth to one or more of the simulated force of gravity and the ensuing forces of friction between garment pieces, or between garment pieces and the subject's body, so as generate a portrayal subject in an alternate way, thereby re-using a pre-simulation and thus reducing the total computation required by the new simulation.

Anticipatory Simulation:

In much the same way the system does speculative simulations during periods of low utilization, the system will anticipatorily simulate a garment on a given user even without a specific request to do so. Such simulations shall be referred to as "anticipatory simulation", and have the purpose to reduce the wait time for a PFP to zero when available system resources permit. The following context will illustrate the benefits of anticipatory simulations.

In a given user session, when a recognized user is browsing a 3rd party web page containing the ONLINE TRY-ON$^{SM}$ service, the small amount of code embedded in such a participating web page will advise the ONLINE TRY-ON$^{SM}$ system every time a user with known measurements lands on a garment product webpage. It is expected that a typical user will review information about a garment when arriving on such a page, and may proceed to try-on the garment featured on such a page. Rather than waiting for an explicit try-on request from the user, the ONLINE TRY-ON$^{SM}$ system may proceed to simulate that garment on the user, even when no explicit request has (yet) been made, provided that the system has sufficient idle system resources. In this way the anticipatorily simulated garment will typically be completed and stored in the same way a speculative simulation is stored. If the user does not proceed to try-on the anticipatively simulated garment then no harm is done and the system has one additional garment for potential future "nearest match" use. However, if the user does proceed and requests a try-on then the system will be able to immediately return the requested PFP as it has already been anticipatorily simulated. This results in a faster and thus more satisfying user experience, and allows the system's simulation latency time to be significantly reduced, or even totally eliminated. Note this is different and distinct from nearest-match simulations, which contribute to reduced processing and potential wait times, but primarily serve to reduce the computational resource for a given simulation.

User Registration & Feedback 212 in FIG. 1 will now be described. As illustrated, the system allows for Personalized Fit Portrayals (PFPs). The system's design allows SFP requests to be serviced anonymously, however, PFP requests require the system to have the user's body model. Thus, the system maintains body models uniquely representative of each user, in storage repository titled Bodies 306, provided that the user has registered pertinent personal information with the system. A user may have more than one body form in the system if desired, facilitating try-ons for different personal weight levels, for example. It is understood that a user may also use the measurements of someone else, or use the system on behalf of someone else, provided access to the body model is permitted (i.e. if access credentials were provided). When servicing PFP requests, Web Services 102 does user look-up with User Registration & Feedback Mechanism 212 to determine if the requestor is someone who has at least one stored body model via a previous registration. If the requestor is a registered user, the system looks up previous user transaction history and determines if it is appropriate to query the user about his or her satisfaction with a ONLINE TRY-ON[SM] assisted prior purchase, and if it is, invokes Fit Confidence Rating 216 to complete the satisfaction query. Next the system proceeds to complete the PFP request.

If the requesting user is not yet registered, User Registration & Feedback mechanism 212 will proceed to query the requestor for registration via Web Services 102. At a minimum, the user must provide a unique user ID and gender, provided the user opts to supply a 3D model of him- or her-self via an optional up-load. Such an uploaded 3D model would include at a minimum a set of 3D vertices, which define the shape of the body with points in space, or could already be "surfaced", i.e converted into a surface set of vertices in the form of a 3D mesh. A variety of commonly available data formats exist for this purpose. The system may optionally require a minimum model resolution and/or other attributes in order to accept a user into the system and to support sufficient modeling accuracy. The system can accept such data from any 3$^{rd}$ party body scanning service provided said service generates body models acceptable for its use. A variety of companies manufacture such body scanners, including Cyberware of California, USA; Human Solutions of Germany; [TC]2 of North Carolina, USA; and others.

It is anticipated that the majority of user registrations will not be able to supply a 3D model of the registrant, for instance because body scanning services are not conveniently available to the user, or because it would require extra effort by the user to get scanned. In these cases, registration will proceed with a request to have the user supply height and weight values in addition to user ID and gender. Thus User Registration & Feedback 212 requires as a minimum four values to support PFP requests. User Registration & Feedback 212 will allow the optional input of additional body measurements in order to generate a body model of greater representative accuracy. Examples of such additional measurements include, but are not limited to, shoulder circumference, bust circumference, under bust circumference and cup size (female only), waist circumference, hip circumference, inseam, upper thigh circumference, and calf circumference.

Those of skill in the art will appreciate that other and either more or fewer measurements or inputs are contemplated as being within the spirit and scope of the invention. Thus, the invention is not limited to these measurements, ranges, and other inputs, but instead it is within the spirit and scope of the invention to use any suitable input data capable of providing a reasonably accurate garment/body fit portrayal.

Model Generation 214—User registrations processed by User Registration & Feedback 212 pass the input provided by a registrant to Model Generator 214, which proceeds to generate a body model compliant with the system's implementation particulars, e.g. using stitching or other garment assembly algorithms. If the provided input includes a 3D model then the model is processed and stored in the storage repository labeled Bodies 302 within the Simulate & Render Engine 300. If the user did not upload a 3D model then the user-provided measurement values are used to generate a 3D model on the fly.

Model Generation ("Gen") 214 can synthesize models on the fly through the use of a procedural body modeler, a technique understood by one skilled in the art. However, procedural body modeling relies on the controlled morphing of body shape by operating on a reference model, and the representative accuracy that can be achieved is limited unless a large number of input measurements are provided, for example 30, 50, 100, or even more. Many of these measurements would be difficult to obtain, for they would require another person to be present to help take certain user measurements. For example, without the assistance of another person it would be difficult for a user to measure his or her shoulder width or shoulder height. An online try-on service's utility is limited if the system were to require the entry of difficult measurements, or too many measurements, because many prospective users would not be able or willing to provide them. Since a PFP's validity depends in part on simulating a garment on a body form that is highly representative of a given user it is therefore highly desirable to attain the highest level of representative body model accuracy with the least number of inputs. Thus, a more convenient and accurate way to generate highly representative body models is via the method described in the paper titled "The space of human body shapes: reconstruction and parameterization from range scans", first published in 2003 by Allen, Curless, & Popovic at the University of Washington (hereinafter "Popovic, et al."). In their paper, Popovic, et al. use real-world data to model the variation of human shape.

Figure 2:
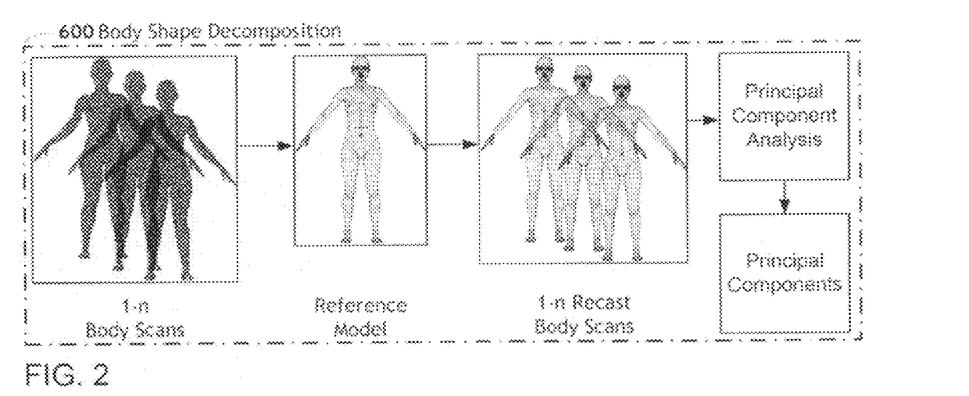
FIG. 2 is an illustration of a body shape decomposition process and an example set of principles that can be used to statically generate the components necessary to enable a subsequent generation of highly representative body models for users of the system.

FIG. 2 provides an illustration of how this type of modeling can be used to support an ONLINE TRY-ON[SM] system. For example a set of unique (example: n=100) body scans of real-world humans is taken, well distributed across gender and the total range of height, weight, and possibly other key dimensional parameters such as waist size, inseam size, and so on. In addition, a 3D artist, using a commonly available 3D authoring tool, constructs a carefully built reference body model mesh. The resultant reference body model mesh is then morphed once per body scan to generate a recast set of real human scans with a consistent surface topology of polygons the sum and arrangement of which resemble a wire-form of a body model. At this point the recast set of (100) body scans of real humans share the same surface topology, yet each member of the recast set has the same unique shape as its corresponding one from the original scan data. The recast body scans are then processed into variance terms using principal component analysis (PCA), representing the space of human bodies, and capturing the principal axes of body shape variation in a set of principal components. Doing this is computationally intensive, but is only done once, during initial set up, before operation of the system commences.

Figure 3:
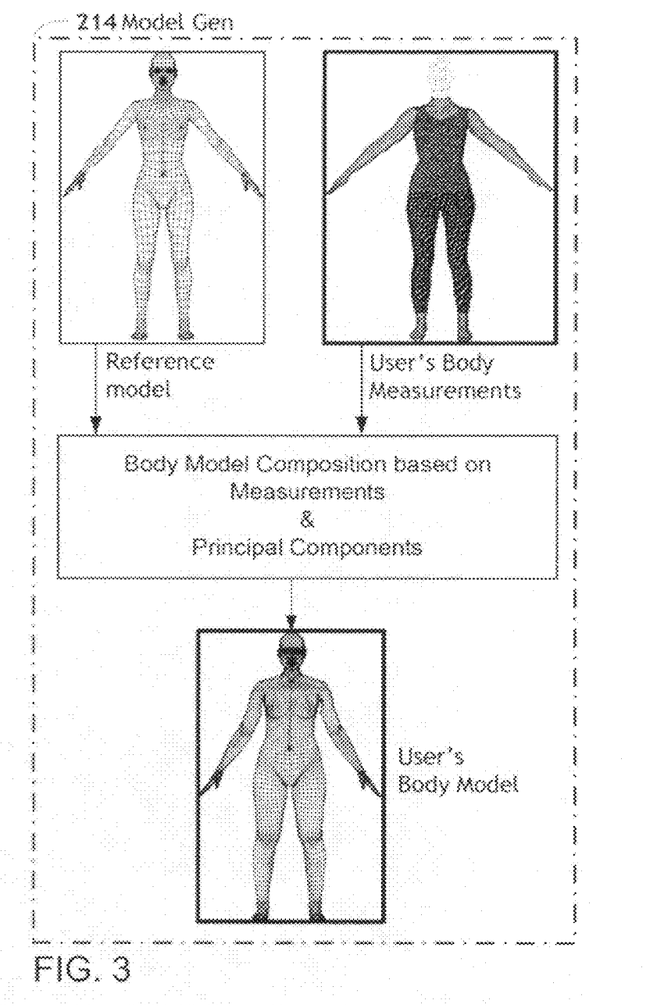
FIG. 3 is a further illustration of the body modeling process and how it can conveniently generate highly representative body models dynamically and on-the-fly for users of the system with minimal inputs.

FIG. 3 shows how resultant PCA components are then used to repeatedly synthesize body models representative of a new user. A new user does not necessarily have a shape akin to any particular individual from the original real-world example set. However, a body model representing this new user can be obtained with little computational complexity and thus in less than one second using a contemporary microprocessor. This is achieved by taking a given user's body measurement inputs such as height, weight and other (optional) parameters (e.g. dimensions) and solving for this measurement set in the body space characterized by the PCA, using a multi-dimension optimization method. The result is a vector describing this body in the space of possible bodies. A body model matching the user is obtained by summing the PCA main components weighted by the vector's values, and subsequently stored in FIG. 1's storage repository labeled Bodies 302 for future use. The advantage of this method is a body model that looks like a real human and is highly representative of a given user because it is not only highly correlated to the user's measurement inputs, but is also akin in shape to the user even in areas of the body that are not defined via explicit measurements. A further advantage is that this method can produce uncannily accurate results with few inputs (fewer than approximately 10-20 measurements, as opposed to 100 or more). Thus, a realistic facsimile of a user's body is then available for the purposes of creating PFPs, at greatly reduced input, computational, and time complexity.

Next, Fit Confidence ("Conf") Rating 216 will be described. The system as described in the preceding paragraphs has the unique ability to interactively generate PFPs at scale with ever-decreasing simulation times and with accuracy even when relatively few (e.g. fewer than approximately 10) user specific measurement parameters are known. To further improve accuracy, the system is designed to collect "prior use" feedback about garment purchases that have occurred with the assistance of ONLINE TRY-ON$^{SM}$, and then to use that information to improve the system's service. Fit Confidence Rating 216 has three principal functions: to conduct fit satisfaction queries with a user regarding the accuracy of previously provided PFPs, i.e. after a PFP was used to acquire a garment and subsequently experienced by the user in real-life fit; to analyze the completeness of a number of factors that are key determinants of PFP accuracy; and to provide a fit confidence rating (example: 0-100%) that can be optionally displayed by the system alongside any PFP in order to manage the expectations a user may have of the system regarding PFP accuracy. Fit satisfaction queries are optionally initiated when user registration is checked, and if enabled, collects user specific garment experiences regarding real-life fit. The system uses that information to build a preference profile such that such preferences can influence the simulation and rendering of future PFPs. PFP accuracy can be rated based on a number of factors, including how many measurements a user has provided, how many garments have been purchased using ONLINE TRY-ON$^{SM}$, and how many previous fit satisfaction queries have been answered by a given user. Fewer measurements would result in a somewhat lower rating, whereas more measurements (up to the system's maximum input fields) would generate a higher rating, and availability of a body model based on a user's scan plus positive feedback on real-life fit from prior use would be required to generate the highest rating. This capability allows a new user to get started with only a few inputs—and thus little effort—but then allows a user to offer more inputs over time in order to enjoy PFPs with the highest possible fit confidence rating, thus removing the uncertainty of fit when evaluating garments online.

Garment Instantiation (instantiation-specific garment fit portrayal data processor) 208 provides system operators with the ability to make garments available for use in SFPs and PFPs. Garment data including a garment piece parts list, piece spatial properties, piece mechanical parameters, piece optical parameters, and assembly information are uploaded via Web Services to Garment Instantiation 208, where it is processed. Processing of garment data includes the ability to model a given garment in 3D, and to allow system operators to review and verify a garment's appearance before releasing it to the system for use. Once released, the resultant garment data is subsequently deposited in storage for use with Simulate & Render Engine 300, and a retrieval link, such as a uniform resource locator (URL), is returned to the system operator. The system operator can then optionally publish the link on any website 400, from which SFPs and PFPs using the instantiated garment can then be requested via Web Services 102.

Custom Garment 210 provides system operators with the ability to optionally make certain garments available in the same manner as above, but with the added capability of enabling a fit adjustment mechanism in support of custom tailored garments. Custom garments are ones in which the system can either automatically, or with user assistance, adjust fit, and return certain additional information about a garment's fit on a given user's body model to the manufacturer of said custom garments. This in turn can enable custom ordering capability in which the manufacturing of the garment can be tailored to a given user's fit preferences.

In summary, the invention described here serves to provide online try-ons of garments or other textile articles, and to reduce a user's fit uncertainty by way of returning personalized fit portrayals upon request. The invention enables such a try-on service to occur within the context of any web-site, including those of any 3$^{rd}$ party, provided said party provisions their textile articles to the system, and links the try-on services to their web-site, as described, all via web-services which can be accessed over the internet or any private or public network. Then, a visitor to a linked web-site, upon encountering the try-on service in a suitable context on such a web-site, can choose to provide their body measurements, and use the resultant body model as a proxy to try on garments, and get personalized portrayals back. Such body models can be used to try on garments on behalf of oneself, or on behalf of someone else. Further, multiple try-ons can be looked at side-by-side, and enable the comparison of different garments on oneself, or of different sizes of a garment on oneself. Further, the system is built to provide said portrayals conveniently and in a short enough time through the use of parallelization (providing necessary speed), re-use (reducing computational time, thus providing necessary speed, reduced cost, and operation at web-scale), and anticipatory simulation (providing convenience through reduced or eliminated latency from request to result). Taken together, these techniques also enable the use of the system by many simultaneous users.

(Those of ordinary skill will appreciate that such is accomplished in accordance with one embodiment of the invention by standard graphical user interface (GUI) techniques by which garment fit adjustment during a user session is enabled. Such can include, for example, mouse or other pointer device clicks and pop-up and/or pull-down menus within windows that portray the alternative fit portrayals and facilitate adjustments thereto. The GUI in accordance with one embodiment of the invention includes a display window including side-by-side stereoscopic views of the body/model fit portrayal, each taken from a slightly different camera angle, as is known, thereby enabling on-line stereoscopic, 3D image viewing of the fit portrayal by a user equipped with 3D glasses or other suitable viewing aids or displays.)

It will be understood that the present invention is not limited to the method or detail of construction, fabrication, material, application or use described and illustrated herein. Indeed, any suitable variation of fabrication, use, or application is contemplated as an alternative embodiment, and thus is within the spirit and scope, of the invention.

It is further intended that any other embodiments of the present invention that result from any changes in application or method of use or operation, configuration, method of manufacture, shape, size, or material, which are not specified within the detailed written description or illustrations contained herein yet would be understood by one skilled in the art, are within the scope of the present invention.

Finally, those of skill in the art will appreciate that the invented method, system and apparatus described and illustrated herein may be implemented in software, firmware or hardware, or any suitable combination thereof. Preferably, the method system and apparatus are implemented in a combination of the three, for purposes of low cost and flexibility. Thus, those of skill in the art will appreciate that embodiments of the methods and system of the invention may be implemented by a machine such as a special-purpose, proprietary server-based programmed computer or microprocessor by which instructions are executed, the instructions being stored for execution on a computer-readable medium and being executed by any suitable instruction processor. Where appropriate, serial processing by a single processor is contemplated. Where appropriate, parallel processing by one processor with multiple, parallel execution units, or by two or more concurrently operable, parallel processors each with one or more execution units (such as high-speed specialized processing units such as Graphic Processors (GPUs) or other hardware accelerators for fluid, real-time simulation and rendering including specialized techniques such as the use of programmable shaders) is contemplated. Any one or more of such processors and architectures is contemplated as being within the spirit and scope of the invention.

Accordingly, while the present invention has been shown and described with reference to the foregoing embodiments of the invented apparatus, it will be apparent to those skilled in the art that other changes in form and detail may be made therein without departing from the spirit and scope of the invention as defined in the appended claims.

We claim:

1. An on-line garment fit portrayal system configured to operate on a specialized internet server located anywhere and linked over any network including the internet to at least one web-enabled player device located anywhere and capable of common image format display, the system comprising:
   a server-side garment model storage capability containing one or more garments, with parameters for each garment chosen from the groupings that include a garment piece parts list, piece spatial properties, piece mechanical parameters, piece optical parameters, and assembly information;
   a server-side modeler mechanism configured for generating a three-dimensional model of a subject's body suitable fix garment fit portrayals from an individual's registration data, the resultant model being represented by body data stored in a body model storage capability;
   a server-side simulator mechanism operatively coupled with the garment model storage capability and the body model storage capability for simulating a three-dimensional form fit of a garment represented in the garment model storage capability onto a body represented in the body model storage capability, the simulator mechanism producing a portrayal subject model; and
   a server-side rendering mechanism operatively coupled with the simulator mechanism for portraying a perspective view on a web-enabled device's display screen of the portrayal subject model representing a three-dimensional form fit of the garment on the subject's body.

2. The system of claim 1 further comprising:
   an encoding mechanism operatively coupled with the rendering mechanism, the encoding mechanism configured to encode the output of the rendering mechanism into one or more images defined by one or more established image formats for visual presentation to the subject on at least one web-enabled device.

3. The system of claim 2 further comprising:
   a fit-adjustment mechanism configured to enable the subject to adjust one or more of the individual body data and the one or more garment parameters for better fit between the subject's body and the garment.

4. The system of claim 3 which further comprises:
   a server-side special-purpose computer programmed to execute instructions stored in a computer-readable medium, wherein the modeling mechanism, the simulator mechanism, the rendering mechanism, the encoding mechanism, and the fit-adjustment mechanism are implemented within the programmed special-purpose computer.

5. The system of claim 1 which further comprises:
   a server-side special-purpose computer programmed to execute instructions stored in a computer-readable medium, wherein the modeling mechanism, the simulator mechanism, and the rendering mechanism are implemented within the programmed special-purpose computer.

6. The system of claim 1 which further comprises:
   a server-side shading, mechanism operatively coupled with the rendering mechanism, the shading mechanism configured to calculate the surface appearance of any chosen scene element including the garment and the subject's body based upon one or more parameters chosen from the group consisting of perspective, geometry, texture, reflectance, lighting, shadowing, and image post-processing effects.

7. The system of claim 6, wherein the rendering mechanism and the shading mechanism include the use of one or more rasterization techniques.

8. The system of claim 6, wherein the rendering mechanism and the shading mechanism include the use of one or more ray-tracing techniques.

9. The system of claim 1 in which the garment model storage capability includes fabric mechanical and optical attributes relating to the garment model, wherein the simulating and rendering mechanism is comprehensive of the same.

10. The system of claim 9, wherein the mechanical attributes include one or more of weight, weave, bend resistance, stretch resistance, and shear resistance, and wherein the optical attributes include one or more of reflectance and color.

11. The system of claim 1 in which the garment model storage capability includes garment size and pattern piece data, wherein the simulating mechanism includes a stitching mechanism for digitally stitching together pieces of the garment while placed around the subject's body, and subjected to one or more of the simulated force of gravity, and the ensuing forces of friction between garment pieces, or between garment pieces and the subject's body, the garment being represented by the garment size and pattern piece data from the garment model storage capability.

12. The system of claim 1 in which the garment model storage capability includes already stitched and pre-simulated garments, wherein the simulating mechanism previously completed a full simulation of all garments in all sizes on appropriate reference body models suitable chosen by the system operator for proper fit.

13. The system of claim 1 which further comprises:
a Web Services server configured selectively to route plural requests from concurrent users' web-enabled devices to one or more of plural back-end servers; and
an array of plural back-end servers configured to perform one or more of the modeler, the simulator, and the rendering mechanism functions, at least some of the plural back-end servers being configured to operate in parallel with one another,
thereby substantially multiplying the compute power available to serve the plural requests from the concurrent users of the system.

14. The system of claim 13 wherein at least one of the servers within the array of parallel back-end servers includes a hardware accelerator for accelerating one or more of generating, simulating and portraying by one or more respective modeler, simulator and rendering, mechanisms.

15. The system of claim 14, wherein the hardware accelerator includes one or more graphic processing units (GPUs).

16. The system of claim 13, wherein the Web Services server is coupled with a caching server containing a storage capability containing plural previously simulated, or rendered subject models, the Web Services server being configured to determine whether a definedly high level of correlation exists between one or more of the previously simulated, or rendered, subject models and at least one of the fit-and-portray requests.

17. The system of claim 1 further comprising:
a server-side registration mechanism configured to enable a prospective user of the system to supply the individual body data to the modeler mechanism and further to supply personal preferences data to the modeler mechanism,
wherein the modeler mechanism is configured further to comprehend the individual body data and the personal preferences data supplied by the registration mechanism in the three-dimensional model of the subject's body.

18. An on-line fully digital and personalized fit portrayal special-purpose computer program stored on a non-transitory medium and comprising machine-readable instructions, the program including:
garment data access instructions configured, when executed on a server device located remotely from a subject, to cause the device to obtain garment model data from a garment model storage capability;
body data access instructions configured, when executed on the server device, to cause the device to obtain personalized body model data from the subject;
simulating instructions configured, when executed on the server device, to cause the device to simulate a fit of a three-dimensional garment model on a three-dimensional body model by processing the garment model data and the body model data together into a three-dimensional personalized fit portrayal subject model;
rendering instructions configured, when executed on the server device, to cause the device to render the three-dimensional portrayal subject model into a two-dimensional portrayal subject model rendering; and
encoding, instructions configured, when executed on the server device, to cause the device to encode the two-dimensional portrayal subject model rendering for remote viewing thereof by the subject on an web-enabled device.

19. The program of claim 18 further comprising:
shading instructions configured, when executed on the server device, to cause the device to shade at least a garment portion of the two-dimensional portrayal subject model to represent a surface appearance of the same.

20. The program of claim 19 further comprising:
cinematography instructions configured, when executed on the server device, to cause the device to place the portrayal subject model in a scene comprehensive of objects including the portrayal subject model, lighting, one or more camera views, and the like.

21. The program of claim 20, wherein the scene is represented by scene data representative thereof, the scene data being stored in as scene storage capability.

22. The program of claim 21 further comprising:
grip instructions configured, when executed on the server device, to cause the device to facilitate real-time movement of the one or more camera views.

23. The program of claim 18 further comprising:
user interface (UI) instructions configured, when executed on the server device, to cause the device to input changes to one or more of the garment model data and the body model data from the subject and thereafter to re-execute the simulating, rendering, and encoding instructions.

24. The program of claim 18, wherein the instructions are executed by a server-side processor.

25. The program of claim 18, wherein one or more of the simulating, rendering, encoding and shading instructions execute concurrently within one or more graphic processing units (GPUs).

26. A method for providing a digitally personalized garment fit portrayal to one or more concurrently on-line remote subjects, the method comprising:
providing a proprietary server including a processor configured to execute machine-readable instructions thereon, the server being operatively connected to the internet; and
providing machine-readable instructions thereon, the instructions being, stored at a non-transitory data storage medium and being configured when executed by the processor on the server to cause the server to:
a. obtain garment model data from a garment model storage capability;
b. obtain personalized body model data from one or more subjects;
c. simulate a fit of a three-dimensional garment model on a three-dimensional body model by processing the garment model data and the personalized body model data together into one or more three-dimensional personalized fit portrayal subject models;
d. render the one or more three-dimensional portrayal subject models into one or more n-dimensional portrayal subject model renderings; and
e. encode the one or more n-dimensional portrayal subject model renderings and transmit the encoded renderings for remote viewing thereof by the one or more subjects on one or more web-enabled display devices.

27. The method of claim 25, wherein the one or more subjects are plural, and wherein actions a. through e. are performed concurrently and in real-time with respect to each of the subjects' personalized body model data.

28. The method of claim 26 which further comprises:
providing one or more graphic processing units (GPUs) operatively coupled with the processor.

29. The method of claim 25, wherein n is two.

30. The method of claim 25, wherein n is three.

31. The method of claim 25, wherein two-dimensional stereoscopic images are encoded for remote side-by-side 3D viewing thereof by the one or more subjects.

32. The method of claim 25, wherein the garment model data contains parameters including a garment piece parts list, piece spatial properties, piece mechanical properties, piece optical parameters, and assembly information.

33. An on-line garment function fit and style portrayal software-as-a-service (SaaS) system comprising:
   a server-side application software program including machine-readable instructions stored at a non-transitory data storage medium and
   a processor executing, the machine-readable instructions at the server-side, the machine-readable instructions including:
      a) instructions for fining an individual body model into a common garment model to produce a three-dimensional fit model and for portraying the fit model in n-dimensions to a remote user of a web-enabled display device, including internet connected devices, wherein the garment model is defined by garment model parameters including light responsiveness.

34. The system of claim 32 wherein the machine-readable instructions further include:
   b) instructions for encoding, the fit model into an image compatible with viewing on at least one remote web-enabled player device capable of common image format display.

35. The system of claim 33, wherein the processor is capable of concurrently and in real time fitting plural individual body models into plural common garment models to produce plural corresponding three-dimensional fit models and for portraying the plural corresponding fit models in n-dimensions to plural corresponding remote users of plural corresponding web-enabled display devices, including internet connected web devices.

36. The system of claim 32, wherein the instructions for fitting and portraying enable speculative fitting of a hypothetical individual body model into the common garment model at otherwise idle server-side times, thereby to augment a garment body fit and portrayal database.

37. The system of claim 32, wherein the instructions for fitting and portraying enable anticipatory fitting of a real, previously registered individual's body model into the common garment model during an individual user's browsing of an on-line garment shopping web-site, thereby to reduce garment body fit portrayal latency in the event the individual user decides to digitally try on the common garment model.

* * * * *

UNITED STATES PATENT AND TRADEMARK OFFICE
CERTIFICATE OF CORRECTION

PATENT NO. : 8,700,477 B2  Page 1 of 1
APPLICATION NO. : 12/454947
DATED : April 15, 2014
INVENTOR(S) : Andre E. Wolper et al.

It is certified that error appears in the above-identified patent and that said Letters Patent is hereby corrected as shown below:

In the Claims

Column 15:
  at line 56, replace "fix garment fit portrayals" with --for garment fit portrayals--

Column 18:
  at line 14, replace "as scene storage capability." with --a scene storage capability.--

Column 19:
  at line 16, replace "for fining an individual body model into a" with --fitting an individual body model into a--

Signed and Sealed this
Twenty-third Day of September, 2014

Michelle K. Lee
*Deputy Director of the United States Patent and Trademark Office*